United States Patent
Itoh et al.

(10) Patent No.: US 7,944,337 B2
(45) Date of Patent: May 17, 2011

(54) STACKED PTC THERMISTOR AND PROCESS FOR ITS PRODUCTION

(75) Inventors: Kazuhiko Itoh, Chuo-ku (JP); Akira Kakinuma, Chuo-ku (JP); Atsushi Hitomi, Chuo-ku (JP)

(73) Assignee: TDK Corporation, Tokyo (JP)

( * ) Notice: Subject to any disclaimer, the term of this patent is extended or adjusted under 35 U.S.C. 154(b) by 427 days.

(21) Appl. No.: 12/136,924

(22) Filed: Jun. 11, 2008

(65) Prior Publication Data

US 2008/0309448 A1 Dec. 18, 2008

(30) Foreign Application Priority Data

Jun. 12, 2007 (JP) ................ P2007-155397
Mar. 12, 2008 (JP) ................ P2008-063104

(51) Int. Cl.
*H01C 7/10* (2006.01)
(52) U.S. Cl. ..................... 338/22 R; 29/610.1
(58) Field of Classification Search ........... 338/22 R; 29/610.1
See application file for complete search history.

(56) References Cited

U.S. PATENT DOCUMENTS

| | | |
|---|---|---|
| 2002/0130318 A1 | 9/2002 | Kodama et al. |
| 2007/0115090 A1 | 5/2007 | Niimi et al. |

FOREIGN PATENT DOCUMENTS

| | | |
|---|---|---|
| EP | 0 727 791 | 8/1996 |
| EP | 1 717 829 | 11/2006 |
| JP | 1-228104 | 9/1989 |
| JP | 2005-255493 | 9/1989 |
| JP | 8-217536 | 8/1996 |
| JP | 11-102802 | 4/1999 |
| JP | 2000-086336 | 3/2000 |
| JP | 2002-217004 | 8/2002 |
| JP | 2004-128488 | 4/2004 |
| JP | 3636075 | 1/2005 |
| WO | WO 2008/123078 | 10/2008 |

*Primary Examiner* — Kyung Lee
(74) *Attorney, Agent, or Firm* — Drinker Biddle & Reath LLP

(57) ABSTRACT

A stacked PTC thermistor 1 comprises a body 4 obtained by alternating lamination of a semiconductor ceramic layer 2 and an internal electrode 3, and a pair of external electrodes 5a, 5b provided at the edge faces 4a, 4b of the body 4 and electrically connected with the internal electrode 3. The semiconductor ceramic layer 2 is composed of a porous sintered compact containing crystal grains of a barium titanate-based compound, and an alkali metal element is preferentially distributed in at least one of the grain boundaries and voids of the sintered compact.

7 Claims, 3 Drawing Sheets

(A)

(B)

(C)

STACKED PTC THERMISTOR AND PROCESS FOR ITS PRODUCTION

BACKGROUND OF THE INVENTION

1. Field of the Invention

The present invention relates to a stacked PTC thermistor and to a process for its production.

2. Related Background Art

PTC (Positive Temperature Coefficient) thermistors are known as thermistors with positive resistance temperature characteristics, whereby the resistance increases with increased temperature. PTC thermistors are utilized in self-regulating heating units, overcurrent protection elements, temperature sensors and the like. As such PTC thermistors, there have conventionally been implemented single-layer PTC thermistors comprising a semiconductor ceramic layer with conductivity imparted by adding a trace amount of a rare earth element to barium titanate ($BaTiO_3$) as the main component, and a pair of external electrodes sandwiching the semiconductor ceramic layer.

In recent years, demand has sharply increased for PTC thermistors with sufficiently low resistivity at ordinary temperature during non-operating periods (hereinafter referred to as "room temperature resistivity" for convenience), in order to reduce power consumption. Since the room temperature resistance of a PTC thermistor is inversely proportional to the electrode area, a larger electrode area can lower the room temperature resistance. Stacked PTC thermistors obtained by alternating lamination of multiple semiconductor ceramic layers and multiple internal electrodes have been proposed as alternatives to conventional single-layer PTC thermistors. In stacked PTC thermistors, lamination of multiple internal electrodes can drastically increase the electrode area and thus reduce the room temperature resistance.

An example of a stacked PTC thermistor is disclosed in Japanese Patent Publication No. 3636075. This stacked PTC thermistor has an electronic part body obtained by alternating lamination of a barium titanate-based semiconductor ceramic layer and a base metal internal electrode, and an external electrode formed at the edge face of the electronic part body. The stacked PTC thermistor is formed by impregnating the electronic part body with a glass component. In Japanese Patent Publication No. 3636075, the stacked PTC thermistor is indicated as having low resistance and a high withstand voltage.

SUMMARY OF THE INVENTION

In addition to low room temperature resistivity, PTC thermistors must also have a very high ratio of resistivity during operation (hereinafter referred to as "high-temperature resistivity" for convenience) with respect to room temperature resistivity (this ratio will hereinafter be referred to as "jump characteristic" for convenience). A high jump characteristic represents high resistance variation with temperature change, and allows more reliable operation. However, investigation by the present inventors has revealed that while the stacked PTC thermistor disclosed in Japanese Patent Publication No. 3636075 allows the room temperature resistivity to be reduced, it cannot exhibit a sufficient jump characteristic.

The present invention has been accomplished in light of these circumstances, and it is an object thereof to provide a stacked PTC thermistor capable of exhibiting a high level of both low room temperature resistivity and high jump characteristic. It is another object of the invention to provide a process for production of a stacked PTC thermistor having such properties.

As a result of much diligent research on compositions and structures of stacked PTC thermistor semiconductor ceramic layers with the goal of achieving the aforestated objects, the present inventors have found that high levels of both room temperature resistivity and jump characteristic can be obtained by controlling the microstructure.

More specifically, the invention provides a stacked PTC thermistor comprising a body obtained by alternating lamination of a semiconductor ceramic layer and an internal electrode, and a pair of external electrodes provided at either edge face of the body and electrically connected with the internal electrode, the stacked PTC thermistor being characterized in that the semiconductor ceramic layer is composed of a porous sintered compact containing crystal grains of a barium titanate-based compound, and an alkali metal element is preferentially distributed in at least one of the grain boundaries and voids in the sintered compact.

Because this type of stacked PTC thermistor has an alkali metal element preferentially distributed in at least one of the grain boundaries of the crystal grains and the voids composed of the crystal grains of the barium titanate-based compound, it can exhibit high levels of both low room temperature resistivity and high jump characteristic.

The reason for this effect is not thoroughly understood, but the present inventors offer the following conjecture. Since most alkali metal elements are easily oxidized, the alkali metal element preferentially distributed at the grain boundaries and/or voids of the crystal grains causes selective adsorption of oxygen to form oxides in the grain boundaries and/or voids. As a result, it is possible to obtain a high jump characteristic while maintaining low room temperature resistivity.

According to the invention there is also provided a process for production of a stacked PTC thermistor obtained by alternating lamination of a barium titanate-based compound-containing semiconductor ceramic layer and an internal electrode, the process being characterized by comprising a first step in which a laminated body is formed by alternating lamination of the precursor layer for the semiconductor ceramic layer and the precursor layer for the internal electrode, a second step in which the laminated body is fired in a reducing atmosphere to form a porous sintered compact, a third step in which an alkali metal component is adhered to the sintered compact and a fourth step in which the alkali metal component-adhered sintered compact is re-oxidized.

Reoxidation of the sintered compact obtained by firing in the process for production of a stacked PTC thermistor as described above results in oxidation near the grain boundaries of the barium titanate crystal grains in the semiconductor ceramic layer. A PTC property is exhibited as a result. This is believed to occur because oxidation near the grain boundaries forms a Schottky barrier which traps electrons at those sections. Also, since an alkali metal is adhered to the sintered compact obtained by firing the laminated body before reoxidation according to the invention, it is possible to increase the jump characteristic of the obtained stacked PTC thermistor.

Although the mechanism by which adhesion of the alkali metal to the sintered compact before the reoxidation step increases the jump characteristic is not known in detail, the present inventors offer the following conjecture. Namely, adhesion of the alkali metal component to the porous sintered compact before the reoxidation step tends to cause segregation of the alkali metal component at the grain boundaries and numerous voids formed in the sintered compact (for example, grain boundaries formed between three or more crystal grains among the crystal grains composing the semiconductor ceramic layer). The alkali metal component segregated at the grain boundaries in this manner is thought to function as an auxiliary agent to promote chemisorption of oxygen at the grain boundaries or voids in the sintered compact reoxidation step. Oxidation at the grain boundaries and voids is therefore accelerated by the alkali metal component during the reoxidation step. This presumably results in the high jump characteristic. However, the mechanism is not necessarily limited to this explanation.

Conventional stacked PTC thermistors have tended to have greater room temperature resistivity with higher jump characteristics. According to the invention, adhesion of an alkali metal to the sintered compact before the fourth step of reoxidation allows selective oxidation near the grain boundaries and voids of the crystal grains composing the semiconductor ceramic layer in the fourth step. It is thought that since excessive oxidation inside the crystal grains of the barium titanate-based crystal grain does not occur in this case, the semiconductor ceramic layer can maintain low resistance overall. According to the invention, therefore, it is possible to improve the jump characteristic of the stacked PTC thermistor while limiting the room temperature resistivity to a practicably low level.

A solution containing the alkali metal salt is preferably adhered to the sintered compact in the third step of the production process of the invention to adhere the alkali metal component to the sintered compact. This will allow more efficient preferential distribution of the alkali metal element in the grain boundaries and voids of the sintered compact.

According to the production process of the invention, the alkali metal salt is preferably at least one selected from the group consisting of $NaNO_3$, $NaOH$, $Na_2CO_3$, $Na_2SiO_3$, $Li_2O$, $LiOH$, $LiNO_3$, $Li_2SO_4$, $KOH$, $KNO_3$ and $K_2CO_3$. Such alkali metal salts are readily soluble in solvents and therefore the alkali metal elements readily become preferentially distributed at the grain boundaries and voids of the sintered compact.

The molecular weight of the alkali metal salt used in the production process of the invention is preferably 60-130. Such alkali metal salts are easily segregated at the grain boundaries and voids of the sintered compact, thus allowing more selective preferential distribution of the alkali metal elements at the grain boundaries and voids. It will thus be possible to achieve a more excellent jump characteristic while maintaining low room temperature resistivity.

According to the invention it is possible to provide a stacked PTC thermistor capable of exhibiting a high level of both low room temperature resistivity and high jump characteristic. The invention further provides a process for production of a stacked PTC thermistor having such properties.

DESCRIPTION OF THE PREFERRED EMBODIMENTS

A preferred embodiment of the invention will now be explained with reference to the accompanying drawings where necessary. However, the present invention is not limited to the embodiments described below.

Figure 1:
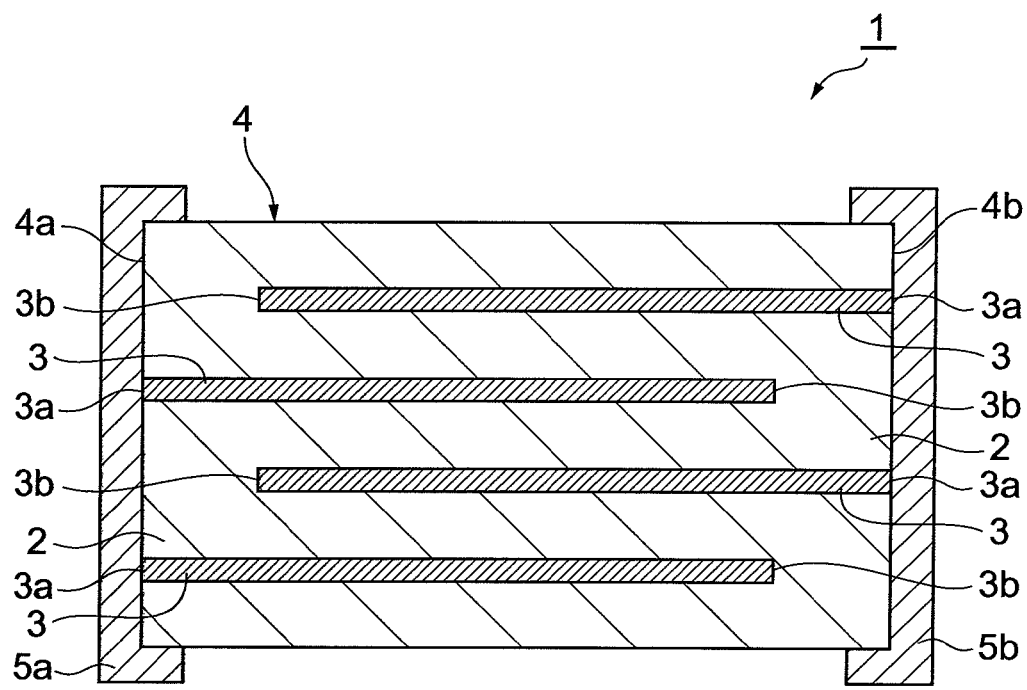
FIG. 1 is a simplified cross-sectional view of a stacked PTC thermistor as a preferred embodiment of a stacked PTC thermistor according to the invention.

As shown in FIG. 1, the stacked PTC thermistor 1 comprises a cuboid body 4 obtained by alternating lamination of a semiconductor ceramic layer 2 and an internal electrode 3, and a pair of external electrodes 5a, 5b formed at the edge faces 4a, 4b of the body 4. The edge faces 4a, 4b are perpendicular to the interface between the semiconductor ceramic layer 2 and the internal electrode 3, and form a pair of surfaces on the body 4 parallel to the lamination direction of the semiconductor ceramic layer 2 and internal electrode 3.

Only one of the electrode ends 3a of each internal electrode 3 is alternately exposed at the edge faces 4a, 4b of the body 4. The other electrode end 3b is positioned inside the semiconductor ceramic layer 2 and is embedded in the body 4. The external electrode 5a is electrically connected with the electrode end 3a of each internal electrode 3 at the edge face 4a of the body 4. The external electrode 5b is electrically connected with the electrode end 3a of each internal electrode 3 at the edge face 4b of the body 4.

That is, the stacked PTC thermistor 1 comprises a body 4 with a semiconductor ceramic layer 2 and a plurality of mutually parallel internal electrode 3 embedded in the semiconductor ceramic layer 2, and external electrodes 5a, 5b formed covering both edge faces 4a, 4b of the body 4 and electrically connected with at least one electrode end 3a of each of the plurality of internal electrode 3.

The semiconductor ceramic layer 2 is composed of a sintered compact containing a barium titanate ($BaTiO_3$)-based ceramic material as the main component and an alkali metal compound as an accessory component. The specific composition as the major component of the semiconductor ceramic layer 2 may be, for example, one in which a portion of the Ba sites of $BaTiO_3$ are replaced with a rare earth element (at least one element selected from the group consisting of Y, La, Ce, Pr, Nd, Sm, Gd, Dy and Er) and a portion of the Ti sites are replaced with at least one element selected from the group consisting of V, Nb and Ta. A portion of the Ba sites may also be replaced with an alkaline earth element such as Sr. Replacing a portion of the Ba with Sr allows the Curie temperature to be varied. The semiconductor ceramic layer 2 may also contain $SiO_2$ or $MnO$.

As examples of preferred main components of the semiconductor ceramic layer 2 there may be mentioned compounds represented by the general formula (1).

$$(Ba_{1-x}RE_x)_\alpha(Ti_{1-y}TM_y)O_3 \tag{1}$$

In general formula (1), RE represents at least one element selected from the group consisting of Y, La, Ce, Pr, Nd, Sm, Gd, Dy and Er. TM represents at least one element selected from the group consisting of V, Nb and Ta.

General formula (1) is a formula wherein a portion of the Ba sites of barium titanate ($BaTiO_3$) are replaced with RE and a portion of the Ti sites are replaced with TM. Replacing a portion of the Ba sites with RE and a portion of the Ti sites with TM according to this embodiment can produce a stacked PTC thermistor exhibiting low resistance and an excellent PTC property.

The values for x and y representing, respectively, the number of Ba sites replaced by RE and the number of Ti sites replaced by TM in general formula (1) preferably satisfy the following formulas (2) and (3).

$$0.001 \leq x \leq 0.003 \quad (2)$$

$$0 \leq y \leq 0.002 \quad (3)$$

The value of a representing the molar ratio of Ba to Ti sites preferably satisfies the following formula (4). This can result in an even higher jump characteristic.

$$0.99 \leq \alpha \leq 1.1 \quad (4)$$

For this embodiment, MnO or $SiO_2$ may be further added to the compound represented by general formula (1). The amount of MnO added is preferably 0.005-0.0015 mol with respect to 1 mol of the elements at the Ti sites of general formula (1) above [i.e. $(Ti_{1-y}TM_y)$]. This can still further improve the PTC property. However, an excessive amount of MnO will tend to result in room temperature resistivity that is too high to provide a satisfactory PTC property, thus producing a NTC (Negative Temperature Coefficient) characteristic whereby the resistance decreases with increasing temperature.

The amount Of $SiO_2$ added is preferably 0.1-0.3 mol to 1 mol of elements at the Ti site of general formula (1) above, from the viewpoint of accelerating sintering of the barium titanate-based compound.

The content of the barium titanate-based compound represented by general formula (1), as the main component of the sintered compact composing the semiconductor ceramic layer 2, is preferably at least 95 wt %, more preferably at least 98 wt % and even more preferably at least 99 wt % with respect to the total sintered compact composing the semiconductor ceramic layer 2. A higher content can produce an even higher level of both low room temperature resistivity and high jump characteristic.

The void percentage of the sintered compact composing the semiconductor ceramic layer 2 is preferably 5-25% and more preferably 10-20%. A void percentage of 5-25% can provide an even higher level of both low room temperature resistivity and excellent jump characteristic.

The jump characteristic according to the invention may be calculated by the following formula (5), for example. A larger value as calculated by the following formula (5) corresponds to a higher jump characteristic and a more excellent PTC property.

$$\text{Jump characteristic} = \text{Log}_{10}(R_{200}/R_{25}) \quad (5)$$

$R_{200}$: Resistivity at 200° C. (high-temperature resistivity)
$R_{25}$: Resistivity at 25° C. (room temperature resistivity)

An alkali metal oxide may be used as the alkali metal compound included as an accessory component in the semiconductor ceramic layer 2. The alkali metal compound content is preferably 0.001-0.007 mol in terms of the alkali metal element with respect to 1 mol of elements at the Ti site of general formula (1) above. A slightly high alkali metal compound content within this range can further improve the jump characteristic. On the other hand, a slightly low alkali metal compound content within this range can further reduce the room temperature resistivity.

Figure 2:
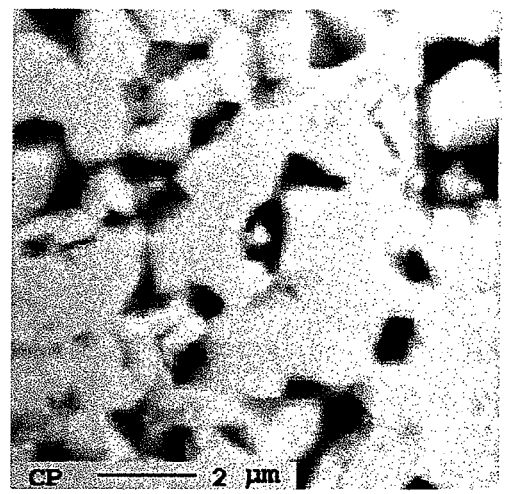
FIG. 2 is an example of the microstructure and element distribution of a semiconductor ceramic layer according to the invention. (A) of FIG. 2 is a photograph (10,000×) showing an example of the microstructure (10 μm region) of a semiconductor ceramic layer according to the invention. (B) of FIG. 2 is an EPMA sodium element map of the semiconductor ceramic layer corresponding to the photograph in (A). (C) of FIG. 2 is an EPMA silicon element map of the semiconductor ceramic layer corresponding to the photograph in (A).
Figure 2:
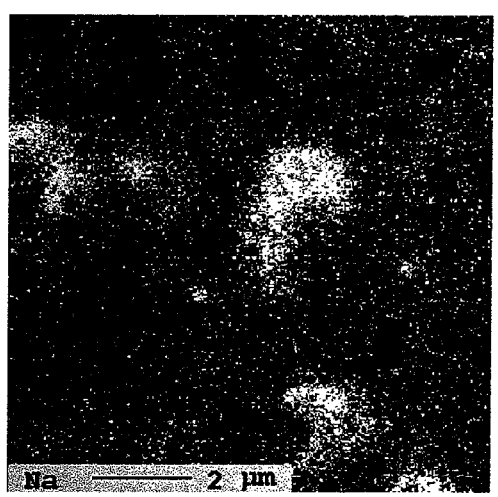
Figure 2:
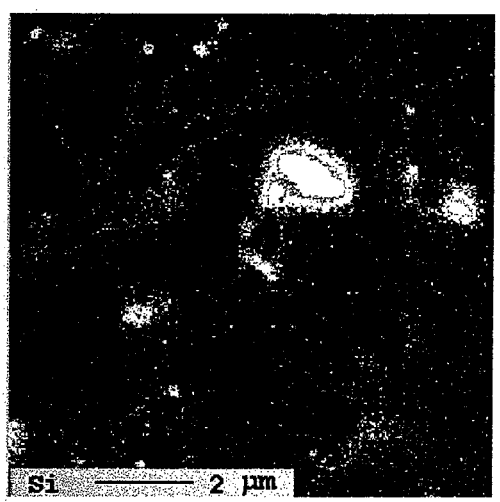

FIG. 2 shows the results of FE-EPMA element mapping for an example of the microstructure and element distribution of a semiconductor ceramic layer according to the invention.

The sample used for analysis was the semiconductor ceramic layer of a stacked PTC thermistor obtained by impregnating a sintered compact composed mainly of a barium titanate-based compound with a $Na_2SiO_3$ aqueous solution (9.5 wt %) and then reoxidizing it in air at 700-800° C. Before the analysis, the surface of the semiconductor ceramic layer was subjected to polishing pretreatment.

(A) of FIG. 2 is a photograph (10,000×) showing the microstructure (10 μm region) of the semiconductor ceramic layer. The light portions in (A) represent the crystal grains of the barium titanate-based compound as the main component, and the dark portions represent voids. As seen in the photograph, the sintered compact of the semiconductor ceramic layer is porous. That is, the semiconductor ceramic layer is composed of a porous sintered compact composed mainly of crystal grains of a barium titanate-based compound.

(B) of FIG. 2 is a sodium element map of the semiconductor ceramic layer corresponding to the photograph in (A). The light portions in (B) represent the locations where sodium element is present. Based on the sodium element map results, sodium element was preferentially distributed at the grain boundaries of the crystal grains and at the voids formed by the crystal grains of the barium titanate-based compound as the main component of the sintered compact composing the semiconductor ceramic layer. The sodium element in the voids is presumably adhering to the walls of the voids (i.e. the surfaces of the crystal grains) as sodium compounds such as sodium oxide.

(C) of FIG. 2 is a silicon element map of the semiconductor ceramic layer corresponding to the photograph in (A). The light portions in (C) represent the locations where silicon element is present. Based on the silicon element map results, silicon element was preferentially distributed at the grain boundaries of the crystal grains and at the voids formed by the crystal grains of the barium titanate-based compound as the main component of the sintered compact composing the semiconductor ceramic layer. The silicon element in the voids is presumably adhering to the walls of the voids (i.e. the surfaces of the crystal grains) as silicon compounds such as oxides (for example, silicon dioxide).

The internal electrode 3 used preferably contains a base metal as the main component. As an example of a specific composition for the internal electrode 3 there may be mentioned Ni or a Ni alloy such as Ni—Pd. As an example of a specific composition for the external electrodes 5a, 5b there may be mentioned Ag or an alloy such as Ag—Pd alloy.

A process for production of the stacked PTC thermistor 1 according to this embodiment will now be explained.

Figure 3:
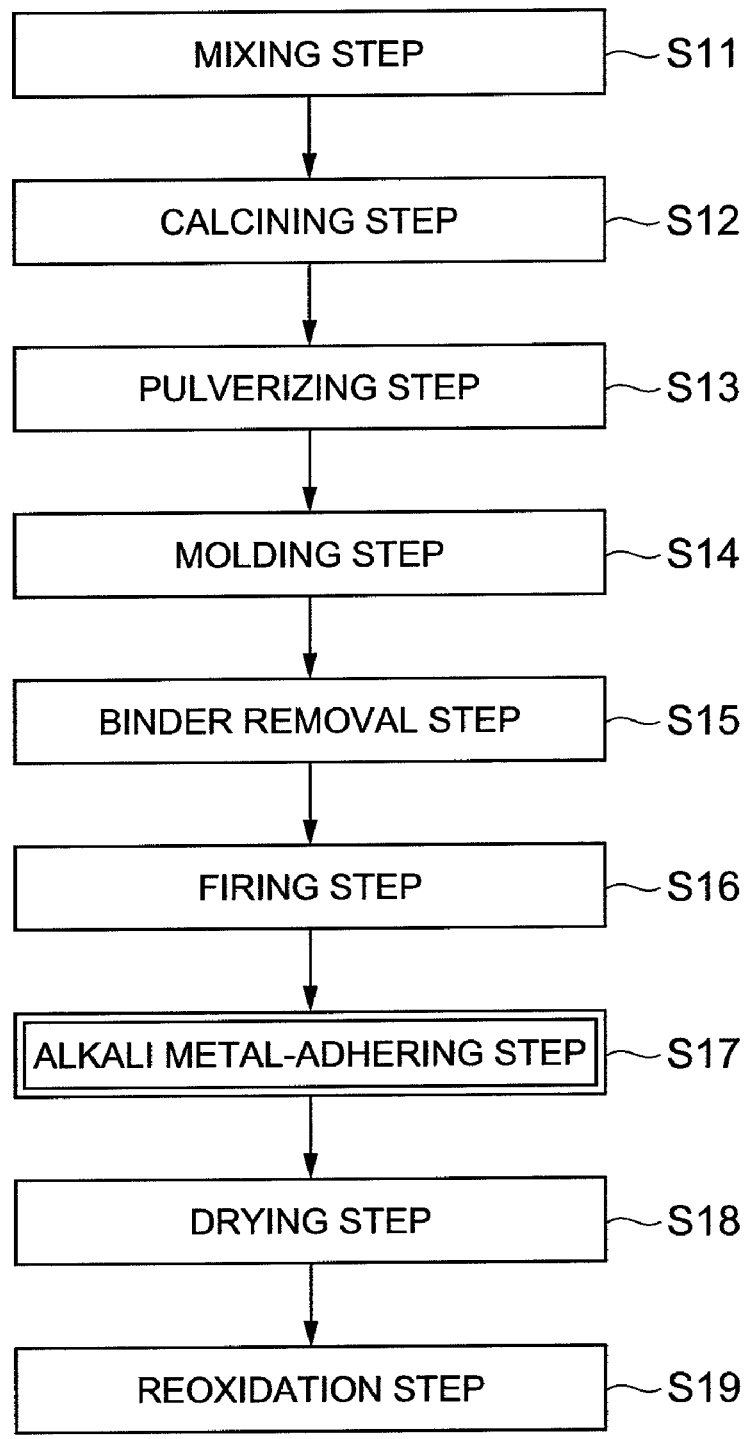
FIG. 3 is a process flow chart showing a preferred example of the process for production of a stacked PTC thermistor according to the invention.

As shown in FIG. 3, the process for production of the stacked PTC thermistor 1 according to this embodiment comprises, as the major steps, a step in which the starting material such as barium titanate is mixed (mixing step; step S11), a step in which the mixed starting material is calcined (calcining step; step S12), a step in which the calcined starting material is pulverized (pulverizing step; step S13), a step in which a laminated body is formed by alternating lamination of the precursor layer for the semiconductor ceramic layer (hereinafter referred to as "semiconductor ceramic precursor layer") and the precursor layer for the internal electrode (hereinafter referred to as "internal electrode precursor layer" (molding step; step S14), a step in which the binder in the laminated body is removed (binder removal step; step S15), a step in which the laminated body obtained from the binder removal step is fired in a reducing atmosphere to form a porous sintered compact (firing step; step S16), a step in which the sintered compact is impregnated with a solution containing an alkali metal salt to adhere an alkali metal component to the sintered compact (alkali metal-adhering step; step S17), a step in which the alkali metal component-adhered sintered compact is dried (drying step; step S18) and a step in which the dried sintered compact is re-oxidized (reoxidation step; step S19). Each step of the process flow shown in FIG. 3 will now be explained.

First, a starting powder for formation of the semiconductor ceramic layer is prepared. The starting powder is composed of a barium titanate-based ceramic material as the main component of the semiconductor ceramic layer, or a compound which is converted to the barium titanate-based ceramic material after the firing step or the reoxidation step. As the latter type of compound there may be mentioned oxides or salts (carbonic acid salts or nitric acid salts) of metals that will compose the barium titanate-based ceramic material. When the semiconductor ceramic layer 2 is to contain a rare earth element for semiconductor use, a rare earth element compound may be added to the starting powder. As rare earth element compounds there may be mentioned compounds (oxides, salts and the like) of one or more elements selected from the group consisting of Y, La, Ce, Pr, Nd, Sm, Gd, Dy and Er. The starting powder may further contain an alkaline earth metal compound such as Sr, a compound of at least one element selected from the group consisting of V, Nb and Ta, and $SiO_2$ or MnO.

After weighing out prescribed amounts of each of the starting powders, they are placed in a nylon pot together with purified water and a pulverizing ball and pulverized and mixed at 4-8 hours in the mixing step (step S11) and dried to obtain a mixed powder.

Next, in the calcining step (step S12), the mixed powder is pre-molded if necessary and calcined for about 0.5-5 hours at an atmosphere temperature of about 1000-1150° C. to obtain a calcined body.

After obtaining the calcined body, it is pulverized in the pulverizing step (step S13) to obtain a calcined powder. Next, the calcined powder is placed in a nylon pot together with purified water and a pulverizing ball, and prescribed amounts of a solvent, binder and plasticizer are added and mixed therewith for about 10-20 hours to obtain a green sheet slurry with a prescribed viscosity. A prescribed amount of a dispersing agent may also be added to the green sheet slurry if necessary.

Next, in the molding step (step S14), a laminated body is formed by alternating lamination of the semiconductor ceramic precursor layer and internal electrode precursor layer. For the molding step, first the green sheet slurry is coated onto a polyester film or the like using a method such as a doctor blade method and dried to obtain a green sheet (semiconductor ceramic precursor layer). The thickness of the green sheet may be about 10-100 μm.

Screen printing or the like is used to print a paste for the internal electrode onto the top of the green sheet obtained in the manner described above. This forms an internal electrode precursor layer composed of the internal electrode paste on the green sheet (semiconductor ceramic precursor layer). The internal electrode paste may be obtained by, for example, mixing and preparing a base metal powder and an electrical insulating material (varnish). The base metal powder used may be, for example, Ni powder or a Ni alloy powder such as Ni—Pd.

Next, a plurality of green sheets with internal electrode precursor layers formed thereon are laminated, and green sheets without internal electrode precursor layers are stacked over the top and bottom. The stack is then pressed and contact bonded in the lamination direction using a pressing machine to obtain a contact bonded stack. The contact bonded stack is cut to a prescribed size using a cutter or the like to obtain a laminated body. In the molding step, the laminated body is formed into a shape corresponding to the body 4 of the stacked PTC thermistor 1. Specifically, the laminated body has a construction wherein the green sheet (semiconductor ceramic precursor layer) and internal electrode precursor layer are alternatingly laminated, and the edge faces of each of the internal electrode precursors are exposed at the right or left edge face of the laminated body while the other edge faces are enclosed inside the laminated body.

In the binder removal step (step S15), the obtained laminated body is held in air at about 250-600° C. for 1-10 hours to remove the liquid components from the laminated body, including the binder in the green sheet.

Next, in the firing step (step S16), the laminated body obtained from the binder removal step is fired for about 0.5-4 hours in a reducing atmosphere at about 1200-1250° C. to obtain a porous sintered compact. The reducing atmosphere is an atmosphere that does not cause oxidation at least in the internal electrode precursor layer, and for example, it may be a mixed atmosphere of hydrogen and nitrogen. Base metals (Ni or Ni alloys, for example) in internal electrode precursor layers have tended to readily oxidize in most cases and lose their function as an internal electrode, but firing the laminated body in a reducing atmosphere can prevent such oxidation when the laminated body is sintered.

The void percentage of the porous sintered compact obtained by the firing step is preferably 5-25% and more preferably 10-20%. The void percentage of the sintered compact correlates with the room temperature resistivity and PTC characteristic of the stacked PTC thermistor 1. If the void percentage is less than 5% the PTC characteristic will tend to be inferior, while if the void percentage exceeds 25%, the room temperature resistivity will be increased and the PTC characteristic will tend to be inferior. On the other hand, a sintered compact void percentage in the aforementioned preferred range will allow suitable oxidation at the grain boundaries and voids of the crystal grains in the sintered compact. The void percentage of the sintered compact can be measured using a porosimeter or the like.

Factors that affect the sintered void percentage of the sintered compact include the composition of the semiconductor ceramic precursor layer and the firing conditions for the laminated body. In order to render the sintered compact porous with void percentages in the preferred range, the composition of the semiconductor ceramic precursor layer is preferably a composition according to one of the following formulas (6)-(9), for example. The laminated body is also preferably fired in a 1200° C., 1% $H_2/N_2$ atmosphere with a dew point of 10° C.

$$(Ba_{0.997}Gd_{0.003})_{1.02}TiO_3+0.05SiO_2+0.001MnO \qquad (6)$$

$$(Ba_{0.9985}Gd_{0.0015})_{1.02}(Ti_{0.9985}Nb_{0.0015})O_3+0.05SiO_2+0.001MnO \qquad (7)$$

$$(Ba_{0.9985}Gd_{0.0015})_{0.995}(Ti_{0.9985}Nb_{0.0015})O_3 \qquad (8)$$

$$(Ba_{0.998}Sm_{0.002})_{1.002}TiO_3 \qquad (9)$$

After obtaining the porous sintered compact by the firing step, an alkali metal component such as an alkali metal is adhered to the sintered compact in the alkali metal adhering step (step S17). The alkali metal is preferably one or more elements from among Li, Na and K, for example. The method for adhering the alkali metal component to the sintered compact is not particularly restricted, but it is preferably a method of adhering a solution containing the alkali metal salt to the sintered compact. More specifically, the sintered compact is impregnated with the solution containing the alkali metal salt. Impregnating the sintered compact with the solution containing the alkali metal salt causes the solution to permeate into the sintered compact, thus allowing the alkali metal salt to adhere preferentially to the voids and grain boundaries in the sintered compact composed mainly of the barium titanate-based compound.

As alkali metal salts there are preferred one or more selected from the group consisting of $NaNO_3$, NaOH, $Na_2CO_3$, $Na_2SiO_3$, $Li_2O$, LiOH, $LiNO_3$, $Li_2SO_4$, KOH, $KNO_3$ and $K_2CO_3$. These alkali metal salts readily dissolve in solvents such as water, and tend to adhere more readily to the voids and grain boundaries of the sintered compact when the sintered compact is impregnated with the solution.

In the process for production of the lamination PTC thermistor 1 according to the embodiment described above, it is preferred to use an alkali metal salt with a molecular weight of 80-130 and more preferably 84.995-122.063. Alkali metal salts with molecular weights in this range easily segregate at the grain boundaries and voids of the sintered compact, thus allowing more selective preferential distribution of the alkali metal elements at the grain boundaries and voids. This allows both low room temperature resistivity and a high jump characteristic to be achieved more reliably.

Other methods of adhering the alkali metal salt to the barium titanate-based compound particles, as alternatives to the method described above, may involve coating or spraying the solution containing the alkali metal salt. The solution containing the alkali metal salt is not particularly restricted so long as the alkali metal salt is dissolved therein, and an aqueous solution or organic solution may be used.

The concentration of the alkali metal salt in the solution containing the alkali metal salt is preferably 0.01-0.08 mol % and more preferably 0.01-0.03 mol % in terms of the alkali metal element. By using the alkali metal salt solution at 0.01-0.03 mol % it is possible to more selectively segregate the alkali metal compound at the grain boundary sections and voids of the crystal grains in the sintered compact. The alkali metal salt concentration can be varied within the aforementioned range in order to adjust the final amount of alkali metal compound in the sintered compact. If the concentration of the alkali metal salt in the solution is too low, the amount of alkali metal compound present at the grain boundaries and voids of the sintered compact will be insufficient, tending to prevent oxidation from proceeding sufficiently at the grain boundaries of the crystal grains. Such a situation will tend to result in an insufficient jump characteristic-increasing effect. On the other hand, if the alkali metal salt concentration in the solution is too high, an excessive amount of alkali metal salt will adhere to the sintered compact, tending to result in infiltration of the alkali metal into the grains in subsequent steps and causing excessive oxidation through to the interior of the sintered compact. Such a situation will tend to interfere with the low room temperature resistivity.

After the sintered compact has been impregnated with the solution containing the alkali metal salt, the sintered compact is dried in the drying step (step S18).

Next, in the reoxidation step (step S19), the dried sintered compact is heat treated in an oxidizing atmosphere for reoxidation to obtain a body 4. The conditions for reoxidation are conditions that allow at least the obtained semiconductor ceramic layer 2 to reliably exhibit a PTC characteristic while preventing oxidation of the internal electrode 3. The reoxidation conditions include the oxygen concentration of the oxidizing atmosphere, heat treatment temperature and heat treatment time, and these may be appropriately set according to the dimensions of the sintered compact. Appropriately setting the conditions can yield a stacked PTC thermistor 1 with suitable room temperature resistivity and a suitable PTC characteristic.

Specifically, for this embodiment, the heat treatment temperature during the reoxidation step is preferably 600-800° C. and more preferably 700-800° C. If the heat treatment temperature is too low, oxidation at the grain boundaries of the crystal grains in the sintered compact will not proceed sufficiently, and the effect of increasing the jump characteristic will be minimal. If the heat treatment temperature is too high, on the other hand, the internal electrode will tend to be oxidized. The oxygen concentration of the oxidizing atmosphere is preferably about 0.1-30 vol %, and the heat treatment time is preferably about 0.5-2 hours.

In the reoxidation step, the alkali metal salt that has adhered to the grain boundaries and voids of the sintered compact in the alkali metal-adhering step may in some cases be oxidized to an oxide. This can produce a stacked PTC thermistor capable of exhibiting a high level of both low room temperature resistivity and high jump characteristic.

After the reoxidation step, both edge faces 4a, 4b of the body 4 are coated with their external electrode pastes and then baked in air at about 550-650° C. to form external electrodes 5a, 5b at the edge faces. As examples for the external electrode paste there may be used Ag paste, Ag—Pd paste or the like. As a result, it is possible to obtain a stacked PTC thermistor 1 having the construction shown in FIG. 1.

The process for production of a stacked PTC thermistor 1 according to the embodiment described above comprises adhering an alkali metal salt to crystal grains of a barium titanate-based compound in the sintered compact after the firing step and before the reoxidation step. This permits sufficient reoxidation near the grain boundaries of the sintered compact composing the semiconductor ceramic layer 2. The jump characteristic of the obtained stacked PTC thermistor 1 can be increased as a result.

Conventional stacked PTC thermistors have tended to have greater room temperature resistivity as the jump characteristic of the stacked PTC thermistor increases. In this embodiment, the alkali metal salt selectively adheres near the grain boundaries in the alkali metal-adhering step, causing selective oxidation near the grain boundaries in the reoxidation step and segregation of the alkali metal compound at the grain boundaries. It is therefore possible to adequately increase the jump characteristic while maintaining an adequately low value for the room temperature resistivity of the stacked PTC thermistor 1.

The semiconductor ceramic layer 2 in the stacked PTC thermistor 1 obtained by the production process described above contains a barium titanate-based compound as the main component and an alkali metal component as an accessory component. As shown in FIG. 2, the alkali metal component is segregated at either or both the grain boundaries of the crystal grains of the barium titanate-based compound and the voids formed by the crystal grains.

A preferred embodiment of the stacked PTC thermistor and process for its production according to the invention was explained above, but the invention is not necessarily limited to this embodiment.

For example, a semiconductor ceramic precursor layer composed of a green sheet and an internal electrode precursor layer composed of an internal electrode paste were used as examples in the production process described above, but the semiconductor ceramic precursor layer and internal electrode precursor layer are not necessarily limited to these so long as a semiconductor ceramic layer and internal electrode can be obtained by firing and reoxidation.

Also, an example of adhering an alkali metal salt solution in the alkali metal-adhering step was explained above, but the alkali metal salt may instead by directly adhered to the sintered compact without using a solution. The stacked PTC thermistor is also not limited to the structure described above and may have different numbers of laminated layers or different positions for forming the internal electrode.

EXAMPLES

The present invention will now be explained in greater detail based on examples and comparative examples, with the understanding that these examples are in no way limitative on the invention.

Example 1

Fabrication of Stacked PTC Thermistor

First, as starting powders for formation of the semiconductor ceramic layer there were prepared powders of $BaCO_3$, $TiO_2$, $Gd_2O_3$, $SiO_2$ and $Mn(NO_3)_2 \cdot 6H_2O$. The starting powders were weighed out in amounts for a barium titanate-based compound composition according to formula (6) above. The weighed amounts of each of the starting powders were placed in a nylon pot together with purified water and a pulverizing ball and mixed for 6 hours and dried to obtain a mixed powder.

After subsequent pre-molding of the mixed powder, it was held for 4 hours in air at 1150° C. and calcined to obtain a calcined body. The calcined body was shredded to form a calcined powder with a mean particle size of 1 μm. Next, the calcined powder was placed in a nylon pot together with purified water and a pulverizing ball, and prescribed amounts of a solvent, binder and plasticizer were added and mixed therewith for about 20 hours using a triple roll to obtain a green sheet slurry. The mixing ratios of the solvent, binder and plasticizer were 50 parts by weight, 5 parts by weight and 2.5 parts by weight to 100 parts by weight of the calcined powder.

The obtained green sheet slurry was coated onto the polyester film by a doctor blade method and dried, and then punched out to dimensions of 50 mm×50 mm to fabricate a plurality of 20 μm-thick green sheets (semiconductor ceramic precursor layers). The internal electrode paste was printed onto the top of each green sheet by screen printing to form an internal electrode precursor layer. The internal electrode paste was prepared by kneading 10 parts by weight of $BaTiO_3$ as the electrical insulating material with 100 parts by weight of Ni powder with a mean particle size of 0.2 μm.

Five of the green sheets on which the internal electrode precursor layers had been formed were then stacked, and green sheets with no internal electrode precursor layer formed thereon were stacked above and below the stack, which was then pressed and contact bonded from the lamination direction using a pressing machine to obtain a contact bonded stack. The contact bonded stack was cut with a cutter to form a laminated body with 2 mm×1.2 mm×1.2 mm dimensions. For the cutting, only one end of the internal electrode precursor layer was extended to the edge face of the green sheet, while the other end of the internal electrode precursor was cut so as to be situated inside the green sheet. The spacing between the internal electrode precursor layers in the lamination direction was 14 μm.

The obtained laminated body was heated in air at 300° C. for 8 hours to remove the binder from the laminated body. It was then fired for 2 hours in a reducing atmosphere at 1200° C. to obtain a porous sintered compact. The reducing atmosphere was a mixed atmosphere of hydrogen and nitrogen with a hydrogen/nitrogen volume ratio of 1:99, and the dew point of the mixed atmosphere was 10° C.

The sintered compact was then impregnated with an aqueous solution containing the alkali metal salt, to adhere the alkali metal component to the sintered compact. The alkali metal salt used was $Li_2O$ with a molecular weight of 29.881. The alkali metal (Li) concentration in the aqueous solution of the alkali metal salt ($Li_2O$) was 0.08 mol % as alkali metal element (Li element).

After impregnating the sintered compact with the aqueous solution of $Li_2O$, the sintered compact was dried at ordinary temperature for 1 hour. The sintered compact was heated in air at 700° C. for 2 hours for reoxidation of the sintered compact to obtain a body 4.

After coating the edge faces 4a, 4b of the body 4 with Ag—Pd paste, it was baked in air at 650° C. to form external electrodes 5a, 5b. A stacked thermistor 1 having the construction shown in FIG. 1 was thus obtained.

Examples 2-10

Stacked PTC thermistors for Examples 2-10 were fabricated by the same method as Example 1, except that the alkali metal salts shown in Table 1 were used as alkali metal salts instead of $Li_2O$.

Comparative Example 1

A stacked PTC thermistor for Comparative Example 1 was fabricated by the same method as Example 1, except that the sintered compact was not impregnated with an alkali metal salt aqueous solution.

Comparative Example 2

A stacked PTC thermistor for Comparative Example 2 was fabricated by the same method as Example 1, except that the $Mn(NO_3)_2 \cdot 6H_2O$ content of the starting powder was twice that of Example 1, and the sintered compact was not impregnated with an alkali metal salt aqueous solution. The composition of the barium titanate-based compound in the semiconductor ceramic layer in Comparative Example 2 was that of the following formula (10).

$$(Ba_{0.997}Gd_{0.003})_{1.02}TiO_3 + 0.05SiO_2 + 0.002MnO \qquad (10)$$

Comparative Examples 3 and 4

Stacked PTC thermistors were fabricated for Comparative Examples 3 and 4 by the same method as Example 1, except that the sintered compacts were impregnated with aqueous solutions of the alkaline earth metal salts shown in Table 1 instead of an alkali metal salt aqueous solution.

Comparative Examples 5-7

Stacked PTC thermistors were fabricated for Comparative Examples 5-7 by the same method as Example 1, except that the sintered compacts were impregnated with aqueous solutions of the transition metal salts shown in Table 1 instead of an alkali metal salt aqueous solution.

Comparative Example 8

A powder of the alkali metal salt $Na_2CO_3$ was further prepared as a starting powder. An amount of $Na_2CO_3$ powder was added to the mixed powder of Example 1 corresponding to 0.0035 mol as alkali metal element with respect to 1 mol of Ti element in formula (6) above. A stacked PTC thermistor for Comparative Example 8 was fabricated by the same method as Example 1, except that the mixed powder containing $Na_2CO_3$ powder was used, and the sintered compact was not impregnated with an alkali metal salt aqueous solution.

Comparative Example 9

A powder of the alkali metal salt $Na_2CO_3$ was further prepared as a starting powder. An amount of $Na_2CO_3$ powder was added to the mixed powder of Example 1 corresponding to 0.0005 mol as alkali metal element with respect to 1 mol of Ti element in formula (6) above. A stacked PTC thermistor for Comparative Example 9 was fabricated by the same method as Example 1, except that the mixed powder containing $Na_2CO_3$ powder was used, and the sintered compact was not impregnated with an alkali metal salt aqueous solution.

Comparative Example 10

A stacked PTC thermistor for Comparative Example 10 was fabricated by the same method as Example 1, except that the alkali metal salt aqueous solution was impregnated not into the sintered compact before reoxidation but into the sintered compact after reoxidation.

[Measurement of Void Percentage]

A porosimeter was used to measure the void percentage of the sintered compacts in the semiconductor ceramic layers of each of the stacked PTC thermistors obtained for Examples 1-10 and Comparative Examples 1-10. The measurement results are shown in Table 2.

[Measurement of Resistivity]

Each of the stacked PTC thermistors of Examples 1-10 and Comparative Examples 1-10 were used to measure the resistivity at 25° C. [$R_{25}$ (units: Ωcm); room temperature resistivity] and the resistivity at 200° C. [$R_{200}$ (units: Ωcm); high-temperature resistivity]. The resistance variation range $R_{200}/R_{25}$ and the $\log_{10}(R_{200}/R_{25})$ were also determined from the measured values for the room temperature resistivity $R_{25}$ and high-temperature resistivity $R_{200}$. The measurement results for Examples 1-10 and Comparative Examples 1-10 are shown in Table 1. A larger resistance variation range $R_{200}/R_{25}$ signifies a higher jump characteristic of the stacked PTC thermistor. For a stacked PTC thermistor, a smaller room temperature resistivity $R_{25}$ is preferred, and a larger high-temperature resistivity $R_{200}$ and a larger resistance variation range $R_{200}/R_{25}$ are preferred.

TABLE 1

| | Metal salt (*1) | | | Void percentage (%) | 25° C. Resistivity $R_{25}$ [Ω cm] | 200° C. Resistivity $R_{200}$ [Ω cm] | Resistance variation range | |
|---|---|---|---|---|---|---|---|---|
| | Chemical formula | Mol. wt. | mol % | | | | $R_{200}/R_{25}$ | $\log_{10}(R_{200}/R_{25})$ |
| Comp. Ex. 1 | No impregnation | — | — | 14 | $2.33 \times 10^2$ | $7.36 \times 10^4$ | $3.16 \times 10^2$ | 2.5 |
| Comp. Ex. 2 | No impregnation | — | — | 14 | $1.00 \times 10^5$ | $3.16 \times 10^8$ | $3.16 \times 10^3$ | 3.5 |
| Example 1 | $Li_2O$ | 29.881 | 0.08 | 14 | $2.40 \times 10^3$ | $1.73 \times 10^8$ | $7.23 \times 10^4$ | 4.9 |
| Example 2 | NaOH | 39.997 | 0.08 | 14 | $1.32 \times 10^3$ | $3.55 \times 10^7$ | $2.69 \times 10^4$ | 4.4 |
| Example 3 | KOH | 56.106 | 0.08 | 14 | $4.25 \times 10^3$ | $1.21 \times 10^{10}$ | $2.84 \times 10^6$ | 6.5 |
| Example 4 | $LiNO_3$ | 68.946 | 0.08 | 14 | $4.26 \times 10^3$ | $1.11 \times 10^9$ | $2.60 \times 10^5$ | 5.4 |
| Example 5 | $NaNO_3$ | 84.995 | 0.08 | 14 | $2.30 \times 10^2$ | $4.58 \times 10^7$ | $2.00 \times 10^5$ | 5.3 |
| Example 6 | $Na_2CO_3$ | 105.988 | 0.08 | 14 | $9.75 \times 10^2$ | $3.44 \times 10^7$ | $3.53 \times 10^4$ | 4.5 |
| Example 7 | $Li_2SO_4$ | 109.946 | 0.08 | 14 | $5.36 \times 10^2$ | $1.07 \times 10^7$ | $1.99 \times 10^4$ | 4.3 |
| Example 8 | $Na_2SiO_3$ | 122.063 | 0.08 | 14 | $7.98 \times 10^2$ | $2.34 \times 10^7$ | $2.93 \times 10^4$ | 4.5 |
| Example 9 | $Na_2SO_4$ | 142.043 | 0.08 | 14 | $4.37 \times 10^2$ | $1.75 \times 10^6$ | $4.01 \times 10^3$ | 3.6 |
| Example 10 | $Na_2B_4O_7$ | 201.219 | 0.08 | 14 | $5.71 \times 10^2$ | $4.61 \times 10^6$ | $8.08 \times 10^3$ | 3.9 |
| Comp. Ex. 3 | $Ca(NO_3)_2 \cdot 4H_2O$ | 164.088 | 0.08 | 14 | $4.81 \times 10^2$ | $2.41 \times 10^5$ | $5.01 \times 10^2$ | 2.7 |
| Comp. Ex. 4 | $CaCl_2 \cdot 2H_2O$ | 110.983 | 0.08 | 14 | $6.78 \times 10^2$ | $3.40 \times 10^5$ | $5.01 \times 10^2$ | 2.7 |
| Comp. Ex. 5 | $CuSO_4 \cdot 5H_2O$ | 159.610 | 0.08 | 14 | $4.93 \times 10^6$ | $2.46 \times 10^7$ | 4.99 | 0.7 |
| Comp. Ex. 6 | $Zn(NO_3)_2 \cdot 6H_2O$ | 189.400 | 0.08 | 14 | $3.33 \times 10^2$ | $1.67 \times 10^5$ | $5.01 \times 10^2$ | 2.7 |
| Comp. Ex. 7 | $Ni(NO_3)_2 \cdot 6H_2O$ | 182.703 | 0.08 | 14 | $3.63 \times 10^2$ | $1.82 \times 10^5$ | $5.01 \times 10^2$ | 2.7 |
| Comp. Ex. 8 | No impregnation | — | — | 14 | $2.00 \times 10^9$ | $2.00 \times 10^9$ | 1 | 0 |
| Comp. Ex. 9 | No impregnation | — | — | 14 | $1.74 \times 10^3$ | $5.51 \times 10^5$ | $3.16 \times 10^2$ | 2.5 |
| Comp. Ex. 10 | Impregnation after reoxidation | 29.881 | 0.08 | 14 | $2.33 \times 10^2$ | $7.37 \times 10^4$ | $3.16 \times 10^2$ | 2.5 |

(*1) The metal salt concentration (mol %) is the concentration in terms of the metal element (alkali metal element, alkaline earth metal element, transition metal element) in the aqueous solution.

It was confirmed that Examples 1-10, wherein the sintered compact before reoxidation was impregnated with an alkali metal salt aqueous solution, had larger $R_{200}/R_{25}$ and $\log_{10}(R_{200}/R_{25})$ values than Comparative Example 1 wherein the sintered compact was not impregnated with an alkali metal salt aqueous solution. It was also confirmed that Examples 1-10 had practicably low values for the room temperature resistivity $R_{25}$.

In Comparative Example 2, the $R_{200}/R_{25}$ and $\log_{10}(R_{200}/R_{25})$ could be increased by varying the composition of the semiconductor ceramic layer, but the $R_{25}$ value was very large compared to Examples 1-10 wherein the sintered compact was impregnated with an alkali metal salt aqueous solution.

It was confirmed that Comparative Examples 3-7, wherein the sintered compact before reoxidation was impregnated with an aqueous solution of an alkaline earth metal salt or transition metal salt, had smaller $R_{200}/R_{25}$ and $\log_{10}(R_{200}/R_{25})$ values than Examples 1-10 wherein the sintered compact before reoxidation was impregnated with an alkali metal salt aqueous solution.

It was also confirmed that Comparative Examples 8 and 9, wherein the alkali metal salt $Na_2CO_3$ was added to the starting powder and the sintered compact was not impregnated with an alkali metal salt aqueous solution, had smaller $R_{200}/R_{25}$ and $\log_{10}(R_{200}/R_{25})$ values than Examples 1-10 wherein the sintered compact before reoxidation was impregnated with an alkali metal salt aqueous solution.

It still further confirmed that Comparative Example 10, wherein not the sintered compact before reoxidation but rather the sintered compact after reoxidation was impregnated with an alkali metal salt aqueous solution, had smaller $R_{200}/R_{25}$ and $\log_{10}(R_{200}/R_{25})$ values than Examples 1-10 wherein the sintered compact before reoxidation was impregnated with an alkali metal salt aqueous solution.

Stacked PTC thermistors with different compositions for the main component were fabricated and evaluated next.

Example 11

Fabrication of Stacked PTC Thermistors

After weighing out $BaCO_3$, $TiO_2$, $Gd_2O_3$ and $Nb_2O_5$ as starting powders in amounts so that the barium titanate-based compound had the composition shown in the following formula (11), they were placed in a nylon pot together with purified water and a pulverizing ball, mixed for 6 hours and then dried to obtain a mixed powder.

$$(Ba_{0.9985}Gd_{0.0015})_{0.995}(Ti_{0.9985}Nb_{0.0015})O_3 \quad (11)$$

A porous sintered compact was prepared in the same manner as Example 1, except for using this mixed powder. The prepared sintered compact was then impregnated with an aqueous solution containing an alkali metal salt, to adhere the alkali metal salt to the sintered compact. The alkali metal salt used was $NaNO_3$ with a molecular weight of 84.995. The alkali metal (Na) concentration in the aqueous solution of the alkali metal salt ($NaNO_3$) was 0.08 mol % as alkali metal element (Na element).

After coating the edge faces 4a, 4b of the body 4 with Ag—Pd paste, it was baked in air at 650° C. to form external electrodes 5a, 5b. A stacked PTC thermistor 1 having the construction shown in FIG. 1 was thus obtained.

Examples 12-34

Stacked PTC thermistors for Examples 12-34 were fabricated by the same method as Example 11, except that the alkali metal salt solutions shown in Table 2 were used as the alkali metal salt solution instead of the 0.08 mol % aqueous solution of $NaNO_3$.

Example 35

$BaCO_3$, $TiO_2$, $Gd_2O_3$, $Nb_2O_5$, MnO and $SiO_2$ were weighed out as starting powders in amounts so that the barium titanate-based compound had the composition shown in the following formula (12). A stacked PTC thermistor for Example 35 was fabricated in the same manner as Example 12, except for using these starting powders.

$$(Ba_{0.9985}Gd_{0.0015})_{1.02}(Ti_{0.9985}Nb_{0.0015})O_3+0.05SiO_2+ \\ 0.001MnO \quad (12)$$

Comparative Example 11

A stacked PTC thermistor for Comparative Example 11 was fabricated in the same manner as Example 11, except that the sintered compact was not impregnated with an alkali metal salt aqueous solution.

Comparative Example 12

A powder of the alkali metal salt $Na_2CO_3$ was further prepared as a starting powder. An amount of $Na_2CO_3$ powder was added to the mixed powder of Example 11 corresponding to 0.0035 mol as alkali metal element with respect to 1 mol of Ti site elements [i.e., $(Ti_{0.9985}Nb_{0.0015})$] in formula (11) above. A stacked PTC thermistor for Comparative Example 12 was fabricated by the same method as Example 11, except that the mixed powder containing $Na_2CO_3$ powder was used, and the sintered compact was not impregnated with an alkali metal salt aqueous solution.

Comparative Example 13

A powder of the alkali metal salt $Na_2CO_3$ was further prepared as a starting powder. An amount of $Na_2CO_3$ powder was added to the mixed powder of Example 11 corresponding to 0.0005 mol as alkali metal element with respect to 1 mol of Ti site elements [i.e., $(Ti_{0.9985}Nb_{0.0015})$] in formula (11) above. A stacked PTC thermistor for Comparative Example 13 was fabricated by the same method as Example 11, except that the mixed powder containing $Na_2CO_3$ powder was used, and the sintered compact was not impregnated with an alkali metal salt aqueous solution.

Comparative Example 14

$BaCO_3$, $TiO_2$, $Gd_2O_3$, $Nb_2O_5$, MnO and $SiO_2$ were weighed out as starting powders in amounts so that the barium titanate-based compound had the composition shown in formula (12) above. A stacked PTC thermistor for Comparative Example 14 was fabricated in the same manner as Comparative Example 12, except for using these starting powders.

Comparative Example 15

$BaCO_3$, $TiO_2$, $Gd_2O_3$, $Nb_2O_5$ and MnO were weighed out in amounts so that the obtained barium titanate-based compound had the composition shown in the following formula (13). The starting powders were placed in a nylon pot together with purified water and a pulverizing ball, mixed for 6 hours and dried to obtain a mixed powder.

$$(Ba_{0.9985}Gd_{0.0015})_{0.995}(Ti_{0.9985}Nb_{0.0015})O_3+ \\ 0.002MnO \quad (13)$$

A stacked PTC thermistor for Comparative Example 15 was fabricated in the same manner as Example 11, except that the aforementioned mixed powder was used as the starting powder without impregnation with an alkali metal aqueous salt solution.

[Measurement of Void Percentage]

A porosimeter was used to measure the void percentage of the sintered compacts in the semiconductor ceramic layers of each of the stacked PTC thermistors obtained for Examples 11-35 and Comparative Examples 11-15. The measurement results are shown in Table 2.

[Measurement of Alkali Metal Content]

An ICP emission analyzer was used to measure the amounts of alkali metal compounds in terms of alkali metals (alkali metal contents) in the semiconductor ceramic layers of each of the stacked PTC thermistors obtained in Examples 11-35 and Comparative Examples 11-15. The measurement results are shown in Table 2. The results of alkali metal quantitation with the ICP emission analyzer matched the amounts of alkali metals calculated based on the assumption that the voids in the sintered compacts were filled with the alkali metal salt aqueous solutions.

[Confirmation of Microstructure]

Each of the stacked PTC thermistors obtained in Examples 11-35 and Comparative Examples 11-15 were analyzed using a CMA X-ray microanalyzer (trade name: JXA8500F by JEOL) to determine the microstructures of the semiconductor ceramic layers, and preferential distribution of the alkali metal element was confirmed. The results are shown in Table 2. The listing of "grain boundaries, voids" in Table 2 indicates that the alkali metal element was preferentially distributed in the grain boundaries and voids.

[Measurement of Resistivity]

Each of the stacked PTC thermistors obtained in Examples 11-35 and Comparative Examples 11-15 were used to measure the resistivity at 25° C. (room temperature resistivity) $R_{25}$ (units: Ωcm) and the resistivity at 200° C. (high-temperature resistivity) $R_{200}$ (units: Ωcm). The resistance variation range $R_{200}/R_{25}$ and the $\log_{10}(R_{200}/R_{25})$ were also determined from the measured values for the room temperature resistivity $R_{25}$ and high-temperature resistivity $R_{200}$.

3.0 or greater. The stacked PTC thermistor of Example 35 exhibited low room temperature resistivity ($R_{25}$) and a high jump characteristic compared to Comparative Example 14 which employed the same barium titanate-based compound.

It is impossible for Comparative Examples 12-14, which contained the alkali metal salt $Na_2CO_3$ in the starting powder and wherein the sintered compacts were not impregnated with an alkali metal salt aqueous solution, to exhibit both low room temperature resistivity and high jump characteristics.

What is claimed is:

1. A stacked PTC thermistor comprising a body obtained by alternating lamination of a semiconductor ceramic layer and an internal electrode, and a pair of external electrodes provided at either edge face of the body and electrically connected with the internal electrode,

TABLE 2

| | Metal salt (*1) | | | Void | | 25° C. Resistivity | 200° C. Resistivity | Resistance variation range | |
|---|---|---|---|---|---|---|---|---|---|
| | Chemical formula | Mol. wt. | mol % | Alkali metal content (*2) | percentage (%) | Alkali metal distribution | ($R_{25}$) [Ω cm] | ($R_{200}$) [Ω cm] | $R_{200}/R_{25}$ | $\log_{10}(R_{200}/R_{25})$ |
| Example 11 | $NaNO_3$ | 84.995 | 0.08 | 0.08 | 14 | Grain boundaries, voids | $6.66 \times 10^2$ | $1.50 \times 10^8$ | $2.25 \times 10^5$ | 5.4 |
| Example 12 | $NaNO_3$ | 84.995 | 0.04 | 0.04 | 14 | Grain boundaries, voids | $1.64 \times 10^2$ | $5.18 \times 10^7$ | $3.16 \times 10^5$ | 5.5 |
| Example 13 | $NaNO_3$ | 84.995 | 0.02 | 0.02 | 14 | Grain boundaries, voids | $3.26 \times 10^1$ | $9.46 \times 10^4$ | $2.90 \times 10^3$ | 3.5 |
| Example 14 | $NaNO_3$ | 84.995 | 0.01 | 0.01 | 14 | Grain boundaries, voids | $2.40 \times 10^1$ | $2.40 \times 10^4$ | $1.00 \times 10^3$ | 3.0 |
| Example 15 | NaOH | 39.997 | 0.01 | 0.01 | 14 | Grain boundaries, voids | $3.00 \times 10^1$ | $3.78 \times 10^4$ | $1.26 \times 10^3$ | 3.1 |
| Example 16 | NaOH | 39.997 | 0.08 | 0.08 | 14 | Grain boundaries, voids | $1.00 \times 10^3$ | $6.31 \times 10^8$ | $6.31 \times 10^5$ | 5.8 |
| Example 17 | $Na_2CO_3$ | 105.988 | 0.01 | 0.01 | 14 | Grain boundaries, voids | $5.00 \times 10^1$ | $7.92 \times 10^4$ | $1.58 \times 10^3$ | 3.2 |
| Example 18 | $Na_2CO_3$ | 105.988 | 0.08 | 0.08 | 14 | Grain boundaries, voids | $1.00 \times 10^3$ | $7.94 \times 10^8$ | $7.94 \times 10^5$ | 5.9 |
| Example 19 | $Na_2SiO_3$ | 122.063 | 0.01 | 0.01 | 14 | Grain boundaries, voids | $3.00 \times 10^1$ | $3.00 \times 10^4$ | $1.00 \times 10^3$ | 3.0 |
| Example 20 | $Na_2SiO_3$ | 122.063 | 0.08 | 0.08 | 14 | Grain boundaries, voids | $7.00 \times 10^2$ | $1.76 \times 10^8$ | $2.51 \times 10^5$ | 5.4 |
| Example 21 | $Li_2O$ | 29.881 | 0.01 | 0.004 | 14 | Grain boundaries, voids | $5.00 \times 10^1$ | $7.92 \times 10^4$ | $1.58 \times 10^3$ | 3.2 |
| Example 22 | $Li_2O$ | 29.881 | 0.08 | 0.028 | 14 | Grain boundaries, voids | $1.00 \times 10^3$ | $5.01 \times 10^8$ | $5.01 \times 10^5$ | 5.7 |
| Example 23 | LiOH | 23.949 | 0.01 | 0.004 | 14 | Grain boundaries, voids | $5.00 \times 10^1$ | $7.92 \times 10^4$ | $1.58 \times 10^3$ | 3.2 |
| Example 24 | LiOH | 23.949 | 0.08 | 0.028 | 14 | Grain boundaries, voids | $1.00 \times 10^3$ | $7.94 \times 10^8$ | $7.94 \times 10^5$ | 5.9 |
| Example 25 | $LiNO_3$ | 68.946 | 0.01 | 0.004 | 14 | Grain boundaries, voids | $1.00 \times 10^2$ | $1.58 \times 10^5$ | $1.58 \times 10^3$ | 3.2 |
| Example 26 | $LiNO_3$ | 68.946 | 0.08 | 0.028 | 14 | Grain boundaries, voids | $1.00 \times 10^3$ | $1.00 \times 10^9$ | $1.00 \times 10^6$ | 6.0 |
| Example 27 | $Li_2SO_4$ | 109.946 | 0.01 | 0.004 | 14 | Grain boundaries, voids | $2.50 \times 10^1$ | $2.50 \times 10^4$ | $1.00 \times 10^3$ | 3.0 |
| Example 28 | $Li_2SO_4$ | 109.946 | 0.08 | 0.028 | 14 | Grain boundaries, voids | $5.00 \times 10^2$ | $6.29 \times 10^7$ | $1.26 \times 10^5$ | 5.1 |
| Example 29 | KOH | 56.106 | 0.01 | 0.017 | 14 | Grain boundaries, voids | $3.00 \times 10^1$ | $3.00 \times 10^4$ | $1.00 \times 10^3$ | 3.0 |
| Example 30 | KOH | 56.106 | 0.08 | 0.119 | 14 | Grain boundaries, voids | $1.00 \times 10^3$ | $5.01 \times 10^8$ | $5.01 \times 10^5$ | 5.7 |
| Example 31 | $KNO_3$ | 101.11 | 0.01 | 0.017 | 14 | Grain boundaries, voids | $3.00 \times 10^1$ | $3.00 \times 10^4$ | $1.00 \times 10^3$ | 3.0 |
| Example 32 | $KNO_3$ | 101.11 | 0.08 | 0.119 | 14 | Grain boundaries, voids | $5.00 \times 10^2$ | $1.26 \times 10^7$ | $2.51 \times 10^4$ | 4.4 |
| Example 33 | $K_2CO_3$ | 138.21 | 0.01 | 0.017 | 14 | Grain boundaries, voids | $3.00 \times 10^1$ | $3.00 \times 10^4$ | $1.00 \times 10^3$ | 3.0 |
| Example 34 | $K_2CO_3$ | 138.21 | 0.08 | 0.119 | 14 | Grain boundaries, voids | $6.00 \times 10^2$ | $9.51 \times 10^6$ | $1.58 \times 10^4$ | 4.2 |
| Comp. Ex. 11 | No impregnation | — | — | 0 | 14 | None | $2.30 \times 10^1$ | $5.78 \times 10^2$ | $2.51 \times 10^1$ | 1.4 |
| Comp. Ex. 12 | No impregnation | — | — | 0.08 | 14 | Indeterminate (*3) | $2.00 \times 10^9$ | $2.00 \times 10^9$ | 1.00 | 0.0 |
| Comp. Ex. 13 | No impregnation | — | — | 0.01 | 14 | Indeterminate (*3) | $1.00 \times 10^2$ | $1.00 \times 10^4$ | $1.00 \times 10^2$ | 2.0 |
| Example 35 | $NaNO_3$ | 84.995 | 0.04 | 0.04 | 14 | Grain boundaries, voids | $5.00 \times 10^3$ | $7.92 \times 10^8$ | $1.58 \times 10^5$ | 5.2 |
| Comp. Ex. 14 | No impregnation | — | — | 0.08 | 14 | Indeterminate (*3) | $2.00 \times 10^9$ | $2.00 \times 10^9$ | 1.00 | 0.0 |
| Comp. Ex. 15 | No impregnation | — | — | 0 | 14 | None | $1.00 \times 10^5$ | $3.16 \times 10^7$ | $3.16 \times 10^2$ | 2.5 |

(*1) The metal salt concentration (mol %) is the concentration in terms of alkali metal element in the aqueous solution.
(*2) Represents the weight proportion (wt %) in terms of alkali metal element with respect to total barium titanate compound in sintered compact.
(*3) No preferential distribution of alkali metal in sintered compact; location of alkali metal could not be determined.

In Examples 11-35 wherein the sintered compacts before reoxidation were impregnated with alkali metal salt aqueous solutions, the alkali metal elements were preferentially distributed in the grain boundaries and voids of the sintered compacts. The stacked PTC thermistors having such structures (Examples 11-35) exhibited high jump characteristics while maintaining low room temperature resistivity ($R_{25}$), compared to Comparative Examples 11-15 which were obtained without impregnation of an alkali metal salt aqueous solution. Specifically, the stacked PTC thermistors of Examples 11-34 all had room temperature resistivity ($R_{25}$) values of below $1\times10^3$ (Ωcm), and $\log_{10}(R_{200}/R_{25})$ values of the stacked PTC thermistor being characterized in that the semiconductor ceramic layer is composed of a porous sintered compact containing crystal grains of a barium titanate-based compound, and an alkali metal element is preferentially distributed in at least one of the grain boundaries and voids in the sintered compact.

2. A process for production of a stacked PTC thermistor obtained by alternating lamination of a barium titanate-based compound-containing semiconductor ceramic layer and an internal electrode, the process being characterized by comprising:

a first step in which a laminated body is formed by alternating lamination of the precursor layer for the semiconductor ceramic layer and the precursor layer for the internal electrode, a second step in which the laminated body is fired in a reducing atmosphere to form a porous sintered compact, a third step in which an alkali metal component is adhered to the sintered compact, and a fourth step in which the alkali metal component-adhered sintered compact is re-oxidized, wherein the alkali metal component is preferentially adhered to at least one of the grain boundaries and voids in the sintered compact.

3. A process for production of a stacked PTC thermistor according to claim 2, characterized in that the alkali metal component is adhered to the sintered compact by adhering a solution containing an alkali metal salt to the sintered compact in the third step.

4. A process for production of a stacked PTC thermistor according to claim 3, characterized in that the alkali metal salt is at least one selected from the group consisting of $NaNO_3$, $NaOH$, $Na_2CO_3$, $Na_2SiO_3$, $Li_2O$, $LiOH$, $LiNO_3$, $Li_2SO_4$, $KOH$, $KNO_3$ and $K_2CO_3$.

5. A process for production of a stacked PTC thermistor according to claim 3, characterized in that the molecular weight of the alkali metal salt is 80-130.

6. A stacked PTC thermistor according to claim 1, characterized in that the barium titanate-based compound is represented by the general formula (1)

$$(Ba_{1-x}RE_x)_\alpha(Ti_{1-y}TM_y)O_3 \tag{1}$$

wherein RE represents at least one element selected from the group consisting of Y, La, Ce, Pr, Nd, Sm, Gd, Dy and Er, TM represents at least one element selected from the group consisting of V, Nb and Ta, and x, y and a satisfy the following formulas (2), (3) and (4)

$$0.001 \leq x \leq 0.003 \tag{2}$$

$$0 \leq y \leq 0.002 \tag{3}$$

$$0.99 \leq \alpha \leq 1.1 \tag{4}$$

7. A process of production of a stacked PTC thermistor according to any one of claims 2 to 5, characterized in that the barium titanate-based compound is represented by the general formula (1)

$$(Ba_{1-x}RE_x)_\alpha(Ti_{1-y}TM_y)O_3 \tag{1}$$

wherein RE represents at least one element selected from the group consisting of Y, La, Ce, Pr, Nd, Sm, Gd, Dy and Er, TM represents at least one element selected from the group consisting in V, Nb and Ta, and x, y and a satisfy the following formulas (2), (3) and (4), $$0.001 \leq x \leq 0.003 \tag{2}$$

$$0 \leq y \leq 0.002 \tag{3}$$

$$0.99 \leq \alpha \leq 1.1 \tag{4}$$

\* \* \* \* \*